(12) United States Patent
Buschhoff

(10) Patent No.: US 7,770,602 B2
(45) Date of Patent: Aug. 10, 2010

(54) DOUBLE WALL PIPE

(75) Inventor: Joerg Buschhoff, Stade (DE)

(73) Assignee: Gall & Seitz Systems GmbH, Hamburg (DE)

( * ) Notice: Subject to any disclaimer, the term of this patent is extended or adjusted under 35 U.S.C. 154(b) by 555 days.

(21) Appl. No.: 11/574,818

(22) PCT Filed: Sep. 28, 2004

(86) PCT No.: PCT/EP2004/010859

§ 371 (c)(1),
(2), (4) Date: Mar. 7, 2007

(87) PCT Pub. No.: WO2006/034724

PCT Pub. Date: Apr. 6, 2006

(65) Prior Publication Data

US 2008/0314469 A1  Dec. 25, 2008

(51) Int. Cl.
*F16L 11/00* (2006.01)
(52) U.S. Cl. .................... 138/114; 138/111; 138/108
(58) Field of Classification Search .............. 138/111, 138/113–116, 110, 108, 148; 285/133.1
See application file for complete search history.

(56) References Cited

U.S. PATENT DOCUMENTS

| | | | | |
|---|---|---|---|---|
| 813,918 | A * | 2/1906 | Schmitz | 165/141 |
| 2,551,710 | A * | 5/1951 | Slaughter | 362/355 |
| 3,102,740 | A * | 9/1963 | Plummer | 285/47 |
| 4,741,880 | A * | 5/1988 | Lang et al. | 420/104 |
| 4,919,885 | A * | 4/1990 | Meyer et al. | 420/104 |
| 5,343,738 | A * | 9/1994 | Skaggs | 73/40.5 R |
| 5,433,252 | A * | 7/1995 | Wolf et al. | 138/113 |
| 5,495,873 | A * | 3/1996 | Butkiewicz et al. | 138/114 |
| 5,611,373 | A * | 3/1997 | Ashcraft | 138/113 |
| 6,009,908 | A * | 1/2000 | Hartnagel et al. | 138/113 |
| 6,112,770 | A * | 9/2000 | Walsh et al. | 138/110 |
| 6,123,110 | A * | 9/2000 | Smith et al. | 138/98 |
| 6,131,615 | A * | 10/2000 | Hartnagel et al. | 138/113 |
| 6,145,545 | A * | 11/2000 | Hartnagel et al. | 138/113 |
| 6,286,556 | B1 | 9/2001 | Kato | |
| 6,289,576 | B1 * | 9/2001 | Wachter et al. | 505/433 |
| 6,840,284 | B2 * | 1/2005 | Schippl et al. | 138/113 |
| 7,069,956 | B1 * | 7/2006 | Mosier | 138/138 |

FOREIGN PATENT DOCUMENTS

| | | |
|---|---|---|
| EP | 1 150 006 A2 | 10/2001 |
| GB | 1 457 087 A | 12/1976 |
| WO | WO 03/010458 A1 | 2/2003 |

\* cited by examiner

*Primary Examiner*—Patrick F Brinson
(74) *Attorney, Agent, or Firm*—Patent Central LLC; Stephan A. Pendorf

(57) ABSTRACT

The present invention relates to a double wall pipe with an inner high pressure pipe (1) having an inner flow space for harmful and/or flammable liquids, particularly fuel to be infected or hydraulic oil, and with an outer protection pipe (2) coaxially arranged around the inner pipe, having an enter flow space between inner pipe and outer pipe, for possibly leaking or spilling liquid from the inner pipe, wherein the protection pipe (2) has several substantially longitudinal arranged grooves (23) throughout its inner surface (21); the inner high pressure pipe (1) is fitted tightly into the protection pipe (2); and after bending the double wall pipe (100), the double wall pipe (100) is unified by surface pressure due to deformation of bending process.

13 Claims, 1 Drawing Sheet

DOUBLE WALL PIPE

CROSS REFERENCE TO RELATED APPLICATION

This application is a national stage of PCT/EP2004/010859 filed Sep. 28, 2004.

BACKGROUND OF THE INVENTION

1. Field of the Invention

The present invention relates to a double wall pipe with an inner high pressure pipe having as inner flow space for harmful and/or flammable liquids, particularly fuel to be injected or hydraulic oil, and with an outer protection pipe coaxially arranged around the inner pipe, having an outer flow space between inner pipe and outer pipe, for possibly leaking or spilling liquid from the inner pipe.

2. Description of Related Art

Industrial steel pipes, widen carry harmful and/or flammable liquids such as fuel, hydraulic oil, acid or others need to have an outer protection as a means of spill prevention. This type of spill prevention is compulsory for main and auxiliary engines on ships required by SOLAS, international convention for the safety of life at sea, regulations. Today standard is to use flexible hoses or simple pipes that cover the pressure-carrying pipe. We are talking about two separated pipes, or pipe and hose drat are carrying out this requirement.

Flexible hoses are usually ruled with complex distance holders. Such distance holders have only limited life lime caused by different vibrations of these two components. For this reason, after not specified time the protection hose gets in touch whit the pressure pipe and starts to cause mechanical damages. The solution of using normal steel pipes as a protection tube causes the same problems of not defined touching surfaces between the components because of bending the pipe during the manufacturing process. Contact corrosion can damage both pipes. Resuming these details a can be stated, that up to now two components are necessary to fulfill the requests of a double wall pipe in order in have any effective spill prevention on pressure carrying pipes.

Especially in the field of large combustion engines used as main or auxiliary engines of ships or in power plants for production of heat and/or electricity, it is known to arrange the fuel pipes of a diesel engine inside another pipe shell in order to keep possible leakage inside the outer shell. In the case of a leakage, the leaking fuel may be carried along inside the outer shell away from the vicinity of the engine. Such in arrangement with a double wall fuel pipe system is described in the European patent application EP 1 150 006 A2.

Further in the U.S. Pat. No. 6,286,536 B1 a high pressure fuel injection pipe for diesel engines with an outer protection pipe in a special, embodiment is disclosed in order to prevent scatter and leakage of a fuel outside the engine. Nevertheless the protection pipe has an inner diameter a little greater than the outer diameter of the injection pipe, so the two tubes are not counseled with each other over section. The vibrations from the engine cause different oscillations of the not uniform parts of the double wall fuel pipe.

Especially for fuel injection pipes for two stroke diesel engines considerable fuel volumes are injected under high pressure through the injectors into the cylinder. Thereby the reciprocating loads from nearly atmospheric pressure to high injection pressure up to 700 bar, the surrounding and frictionally induced heat within and around the fuel pipe up to 100° C. require high quality tubes which are sensitive to damages. Thus undefined different vibrations, undefined touching surfaces and other irregularities can damage both pipes.

Therefore, an object of the invention is to improve the life time of double wall pipes and decrease production costs.

SUMMARY OF THE INVENTION

The present invention consists of a double wall pipe. According to the invention the protection, pipe has several substantially axial arranged grooves through out its inner surface, whereby these grooves function as the outer flow space for possibly leaking or spilling liquid. In order to allow fitting the high pressure inner pipe into the protection pipe, there is only a small clearance between the two telescoped pipes. Thus it is possible to push the inner pipe info the protection pipe. Then the double wall pipe is formed info the desired configuration for the engine etc. by a cold bending process. Deformations in the material of the two telescoped pipes resulting from the bending process causes a unification of the two components of the double wall pipe to one component.

So this double wall pipe behaves like a one component tube. Due to this unification of the pipes, vibrations cannot cause any damages between the protection tube and the high pressure tube, because the double wall pipe according to the invention is working under sued kind of loads as one unit. Vibrations can be easily cut out by using holders directly on the outer surface of the protection pipe. As a result the double wall pipe according to the invention has a considerable improved life time.

The preferred clearance between the inner high pressure pipe and the protection pipe is smaller than 0.5 mm, particularly 0.2 mm. The high precision inner pipes have usually a tolerance of 0.06 mm. With a protection pipe with the same tolerance and a clearance of 0.2 mm between the two pipes it is possible to push the high pressure pipe tightly into the protection pipe by hand. With the bending process the necessary deformations are created and the unification to one component is reached by surface pressure. The bending is carried out in cold condition as required by engine maker.

In order to have a mostly uniform surface pressure after the bending process the grooves are circumferentially regular spaced on the inner surface of the protection pipe. Thereby the stress and strain induced by the bending is distributed to the whole circumference of the outer surface of the sensitive high pressure pipe. Preferred three to twelve, particularly six, axially orientated grooves are provided in the inner surface of the protection pipe.

According to an embodiment of the invention, each groove has a sectional width w of approximately $w = (\pi/2n) \cdot ID_2$, wherein: n is the number of grooves in the protection pipe; and $ID_2$ is the inner diameter of the protection pipe. Thus nearly half of the inner surface of the protection pipe can get in contact with the outer surface of the inner high pressure pipe.

Preferred the cross sectional area of the outer flow space is greater than the cross sectional area of the inner blow space, in order to fulfill the SOLAS requirements.

According to an embodiment, of the invention, the inner pipe has a hardness degree greater than the protection pipe. Thus the very sensitive pressure pipe will hardly be effected daring the bending process. More exactly the material of the protection tube must be chosen, in that way, that even using extreme bonding angles and/or radii the pressure pipe is not affected by mechanical damages like any grooves or surface failures.

In order to prevent stress in the unified double wall pipe by heat variations, the material of the inner pipe has substantially the same thermal expansion coefficient than the material of the protection pipe.

In a preferred embodiment the inner high pressure pipe is a steel tube, particularly of the material St 52.4 and particularly containing C, Si, Mn, P, S and/or Al and the osier pipe is a steel tube, particularly of the material St 35 and particularly in the finishing NBK.

BRIEF DESCRIPTION OF THE DRAWINGS

In the following the invention is described in an embodiment with reference to the appending drawings, in which.

DETAILED DESCRIPTION OF THE INVENTION

Figure 1:
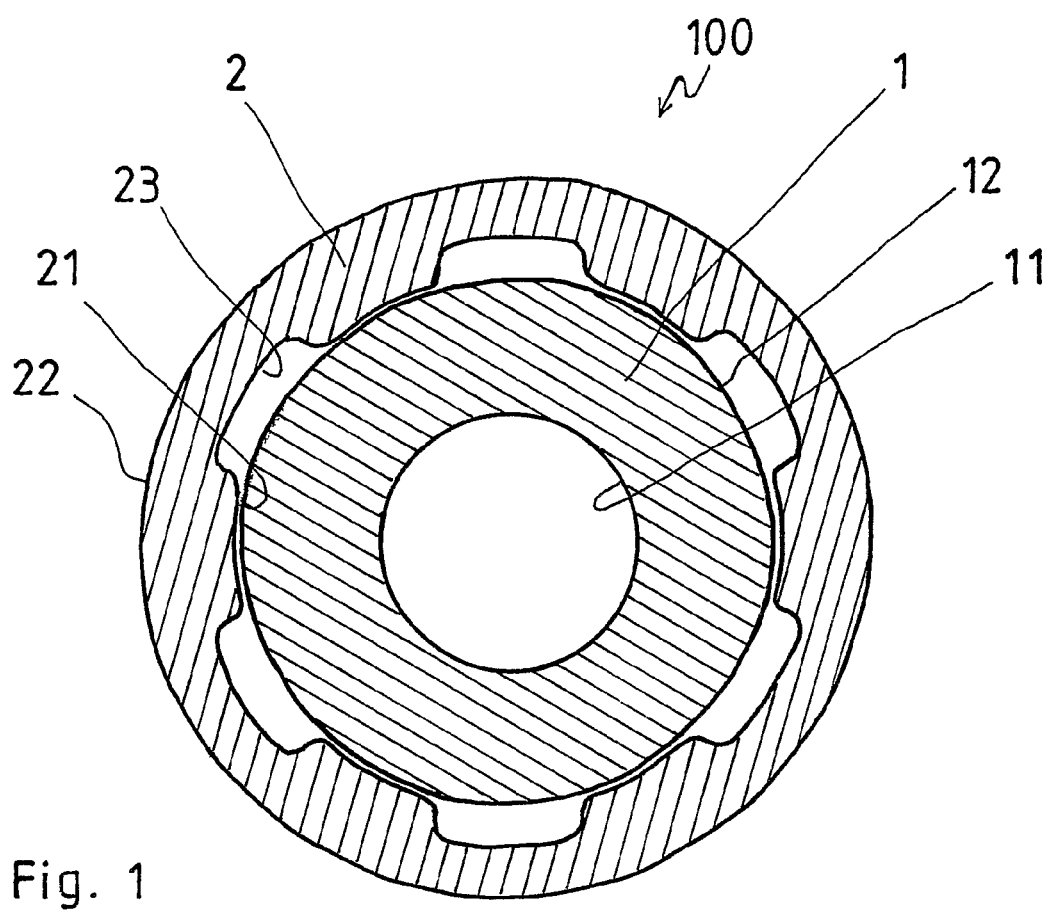
FIG. 1 shows a cross sectional view of a doable wall pipe according to the invention.

FIG. 1 shows a cross sectional view of a double wall pipe 100 consisting of en tuner high pressure pipe 1 and an outer protection pipe 2

The inner high pressure pipe 1 is a seam less precision steel tube of the material St 52.4. The finishing of the steel tube is preferred NBK. The steel tube contains in small tractions the elements C, Si, Mn, P, S and/or Al.

As an example, large diesel engines especially used as main or auxiliary engine of ships and particularly for two stroke diesel engines the high pressure pipe 1 can have the following size: outer diameter $OD_1$=20 mm, inner diameter $ID_1$=9 mm with wall thickness of 5.5 mm. High pressure fuel injection pipes withstand test pressures up to 1.350 bar and bear up to 120° C.

For these requirements a high, precision steel tube with low roughness and only few defects on the inner surface 11 is necessary. Preferably, the inner surface 11 of the high pressure pipe 1 has a tolerance of +/−0.10 mm. Furthermore the outer surface 12 of the high pressure pipe 1 has a tolerance +/−0.06-0.08 mm.

The protection pipe 2 is coaxially arranged to the inner high pressure pipe 1. Thereby the inner diameter $ID_2$ of the protection pipe 2 is only slightly greater than, the outer diameter $OD_1$ of the inner high pressure pipe 1. According to the above described embodiment of the inner high pressure pipe 1 with an outer diameter $OD_1$, of 20.00 mm, the inner diameter of the outer protection pipe 2 by is 20.20 mm.

In the inner surface 21 of the protection pipe 2 there are provided six grooves 23, which are extending axially throughout the pipe. The protection pipe 2 has a cylindrical outer surface 22 with an outer diameter $OD_2$ of 27.00 mop resulting in a wall thickness of 3.4 mm. Due to the grooves 23, having a depth of 1.4 mm, the wall thickness of the protection pipe 2 is reduced in the area of the grooves 23 to 2.00 mm.

Figure 2:
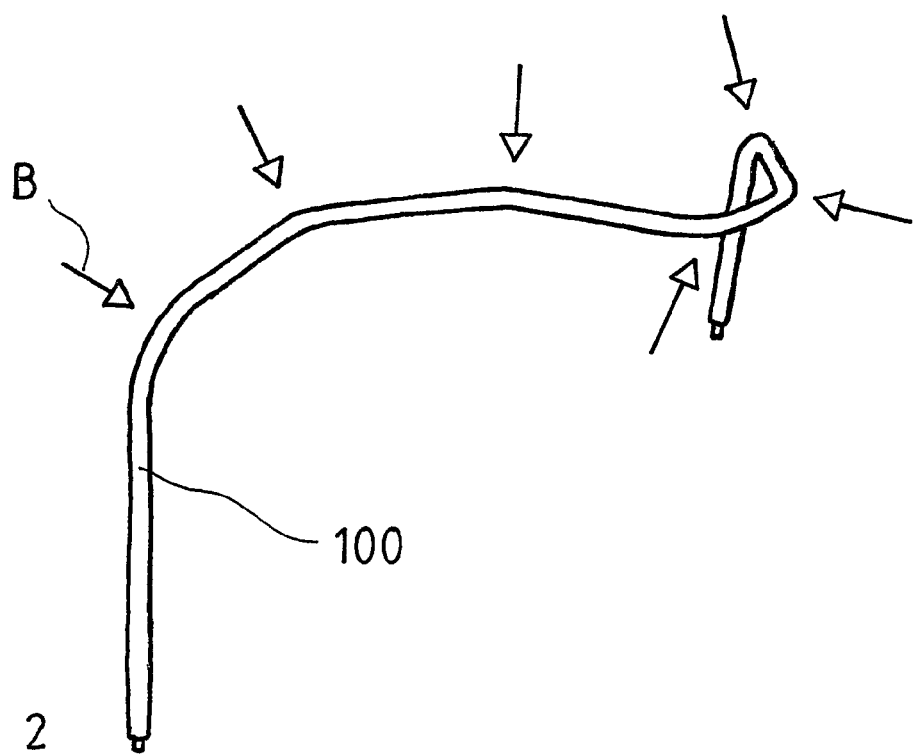
FIG. 2 shows by way of example a bended double wall fuel pipe according to the invention for a diesel engine in schematical three-dimensional view.

For the completion of the manufacturing of a fuel injection pipe the double wall, pipe 100 consisting of the inner high pressure pipe 1 and the outer protection pipe 2 will be cola bended to the configuration fitting to the diesel engine, in which the fuel injection pipe shall be installed. During this bending process the unification is attained by surface pressure due to the deformation of the two pipes 1, 2, caused in the bended portions B of the double wall pipe. An example of a bended fuel dejection pipe is shown in FIG. 2.

Due to the special design of the protection pipe 2 with several axial grooves 23 through out the inner surface 21 of the pipe it is also called "star tube" because it looks like a star in cross sectional view like FIG. 1. The grooves 23 of the star tube 2 provide the required outer flow space for spill protection far possibly leaking liquids. These liquids will flow through the grooves 23 of the star tube 2 to the end of the pipe and can be connected to an alarm system as required by SOLAS.

LIST OF REFERENCE NUMBERS 100 double wall pipe
1 inner high pressure pipe
11 inner surface
12 outers or face
2 protection pipe
21 inner surface
22 outer surface
23 groove
B bended portion

The invention claimed is:

1. A double wall pipe, comprising:

an inner high pressure steel pipe (1) having an inner flow space for harmful and/or flammable liquids; and an outer protection steel pipe (2) coaxially arranged around the inner high pressure steel pipe (1) and having an inner surface (21), the outer protection pipe (2) being formed with a plurality of substantially longitudinally arranged grooves (23) throughout the inner surface (21);

wherein the inner high pressure pipe (1) is fitted tightly into the outer protection pipe (2), the inner high pressure pipe (1) and the outer protection pipe (2) are united into one component (100) by a bending process by surface pressure due to deformation of the bending process such that the grooves (23) form an outer flow space between the inner high pressure steel pipe (1) and the outer protection steel pipe (2), for containing any liquid leaking or spilling from the inner high pressure steel pipe (1), and wherein the inner high pressure pipe (1) has a hardness degree greater than that of the outer protection pipe (2).

2. The double wall pipe according to claim 1, wherein a clearance between the inner high pressure pipe (1) and the outer protection pipe (2) in areas not unified by bending is smaller than 0.5 mm.

3. The double wall pipe according to claim 1, wherein the grooves (23) are circumferentially regularly spaced on the inner surface (21) of the outer protection pipe (2).

4. The double wall pipe according to claim 1, wherein three to twelve axially orientated grooves (23) are provided in the inner surface (21) of the outer protection pipe (2).

5. The double wall pipe according to claim 1, wherein each groove (23) has a sectional width w of approximately $$w=(\pi/2n) \cdot ID2,$$

wherein: n is the number of grooves (23) in the outer protection pipe (2); and ID2 is the inner diameter of the outer protection pipe (2).

6. The double wall pipe according to claim 1, wherein the cross sectional area of the outer flow space is greater than the cross sectional area of the inner flow space.

7. The double wall pipe according to claim 1, wherein the material of the inner high pressure pipe (1) has substantially the same thermal expansion coefficient as the material of the outer protection pipe (2).

8. The double wall pipe according to claim 1, wherein the harmful and/or flammable liquids are fuel or hydraulic oil.

9. The double wall pipe according to claim 2, wherein the clearance between the inner high pressure pipe (1) and the outer protection pipe (2) is 0.2 mm.

10. The double wall pipe according to claim 4, wherein six axially orientated grooves (23) are provided in the inner surface (21) of the outer protection pipe (2).

11. The double wall pipe according to claim 1, wherein the inner high pressure pipe (1) is of the material St 52.4 and contains C, Si, Mn, P, S and/or Al.

12. The double wall pipe according to claim 1, wherein the outer pipe (2) is of the material St 35.

13. The double wall pipe according to claim 1, wherein the double wall pipe is a fuel injection pipe for a two stroke diesel engine.

* * * * *